(12) United States Patent
Mochizuki et al.

(10) Patent No.: US 12,657,690 B2
(45) Date of Patent: Jun. 16, 2026

(54) COMPONENT INSPECTION DEVICE

(71) Applicant: OMRON Corporation, Kyoto (JP)

(72) Inventors: Aoi Mochizuki, Kyoto (JP); Shimpei Fujii, Kyoto (JP); Shinji Sugita, Kyoto (JP)

(73) Assignee: OMRON Corporation, Kyoto (JP)

( * ) Notice: Subject to any disclaimer, the term of this patent is extended or adjusted under 35 U.S.C. 154(b) by 373 days.

(21) Appl. No.: 18/259,624

(22) PCT Filed: Mar. 9, 2021

(86) PCT No.: PCT/JP2021/009188
§ 371 (c)(1),
(2) Date: Jun. 28, 2023

(87) PCT Pub. No.: WO2022/153564
PCT Pub. Date: Jul. 21, 2022

(65) Prior Publication Data
US 2024/0070847 A1 Feb. 29, 2024

(30) Foreign Application Priority Data

Jan. 14, 2021 (JP) ................................. 2021-004036

(51) Int. Cl.
*G06T 7/00* (2017.01)
(52) U.S. Cl.
CPC .... *G06T 7/001* (2013.01); *G06T 2207/20081* (2013.01); *G06T 2207/20084* (2013.01); *G06T 2207/30141* (2013.01)
(58) Field of Classification Search
CPC ........... G06T 7/001; G06T 2207/20081; G06T 2207/20084; G06T 2207/30141; G06T 11/00; G01N 21/95684; G01N 2021/8883
See application file for complete search history.

(56) References Cited

U.S. PATENT DOCUMENTS 8,139,847 B2 * 3/2012 Yamaguchi ........... G06T 7/0004
382/149
10,957,031 B1 * 3/2021 Wu ........................ G06N 20/00
(Continued)

FOREIGN PATENT DOCUMENTS

CN 108447054 A 8/2018
CN 109242820 A 1/2019
(Continued)

OTHER PUBLICATIONS

Office Action issued in Japanese Appln. No. 2021-004036, mailed Jul. 9, 2024. English machine translation provided.
(Continued)

*Primary Examiner* — Bobbak Safaipour
(74) *Attorney, Agent, or Firm* — ROSSI, KIMMS & McDOWELL LLP

(57) ABSTRACT

A component inspection device including: a storage section configured to store at least a non-defective product images; a generation section configured to generate a defective product image using a machine learning model; a setting section configured for a user to set a parameter for component inspection; and an output section configured to perform inspection, by using the parameter, on the non-defective product image stored in the storage section and the defective product image generated by the generation section, the output section being configured to output an inspection result.

12 Claims, 9 Drawing Sheets

(56)                    References Cited

U.S. PATENT DOCUMENTS

| | | | |
|---|---|---|---|
| 11,205,260 | B2* | 12/2021 | Li ......................... G06T 7/0004 |
| 11,797,516 | B2* | 10/2023 | Tepper ................... G06N 20/00 |
| 2002/0122582 | A1* | 9/2002 | Masuda ................ G06T 7/0004 |
| | | | 382/141 |
| 2005/0047644 | A1* | 3/2005 | Wong ................. G01N 21/8806 |
| | | | 382/141 |
| 2009/0222753 | A1* | 9/2009 | Yamaguchi ........... G06T 7/0004 |
| | | | 702/35 |
| 2011/0255081 | A1* | 10/2011 | De Greeve ........ G01N 21/8901 |
| | | | 356/237.2 |
| 2019/0012579 | A1 | 1/2019 | Namiki |
| 2019/0188846 | A1 | 6/2019 | Tamai |
| 2020/0019820 | A1 | 1/2020 | Yoshida |
| 2020/0111217 | A1 | 4/2020 | Yokoyama et al. |
| 2020/0364905 | A1* | 11/2020 | Shimodaira .......... G06N 3/0464 |
| 2021/0012476 | A1 | 1/2021 | Miyazawa et al. |
| 2021/0019878 | A1 | 1/2021 | Iizawa |
| 2023/0142383 | A1* | 5/2023 | Zhang .............. G06Q 10/06395 |
| 2026/0080678 | A1* | 3/2026 | Prakash ............... G06V 20/188 |

FOREIGN PATENT DOCUMENTS

| | | |
|---|---|---|
| CN | 110706308 A | 1/2020 |
| CN | 110853035 A | 2/2020 |
| CN | 111986142 A | 11/2020 |
| JP | 2011214903 A | 10/2011 |
| JP | 2017211259 A | 11/2017 |
| JP | 2017224024 A | 12/2017 |
| JP | 2018005640 A | 1/2018 |
| JP | 2018077147 A | 5/2018 |
| JP | 2018205163 A | 12/2018 |
| JP | 2019106112 A | 6/2019 |
| JP | 2020052520 A | 4/2020 |
| KR | 1020210081077 A | 7/2021 |
| WO | 2018173478 A1 | 9/2018 |
| WO | 2019186915 A1 | 10/2019 |
| WO | 2019188040 A1 | 10/2019 |

OTHER PUBLICATIONS

Office Action issued in Chinese Appln. No. 202180087845.7 mailed Jun. 13, 2025.

Wang et al. "A Data Generation Method for Electricity Theft Detection Using Generative Adversarial Network." Power System Technology. Vol. 44, No. 2, pp. 775-782, Feb. 2020. English abstract provided.

Office Action issued in Japanese Appln. No. 2021-004036, mailed Sep. 3, 2024. English translation provided.

Office Action issued in Japanese Appln. No. 2021-004036, mailed Sep. 3, 2024. English machine translation provided.

International Search Report issued in International Appln. No. PCT/JP2021/009188 mailed May 25, 2021. English translation provided.

Written Opinion issued in International Appln. No. PCT/JP2021/009188 mailed May 25, 2021. English translation provided.

Office Action issued in Chinese Appln. No. 202180087845.7 mailed Feb. 27, 2026.

* cited by examiner

Search for NG
in shortage

Fig. 10A

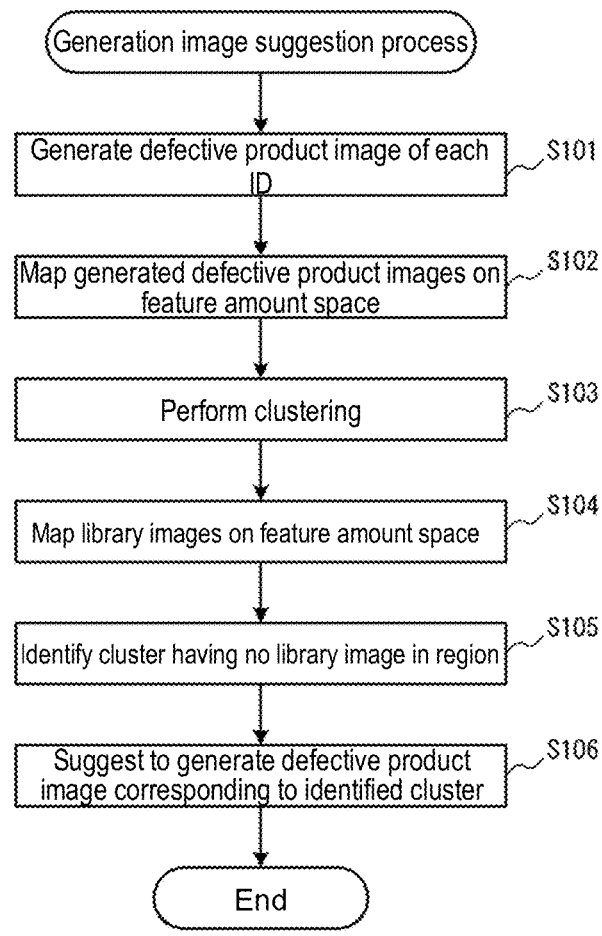

```
Generation image suggestion process

↓

Generate defective product image of each     S101
ID

↓

Map generated defective product images on    S102
feature amount space

↓

Perform clustering                           S103

↓

Map library images on feature amount space   S104

↓

Identify cluster having no library image in region   S105

↓

Suggest to generate defective product        S106
image corresponding to identified cluster

↓

End
```

Fig. 10B

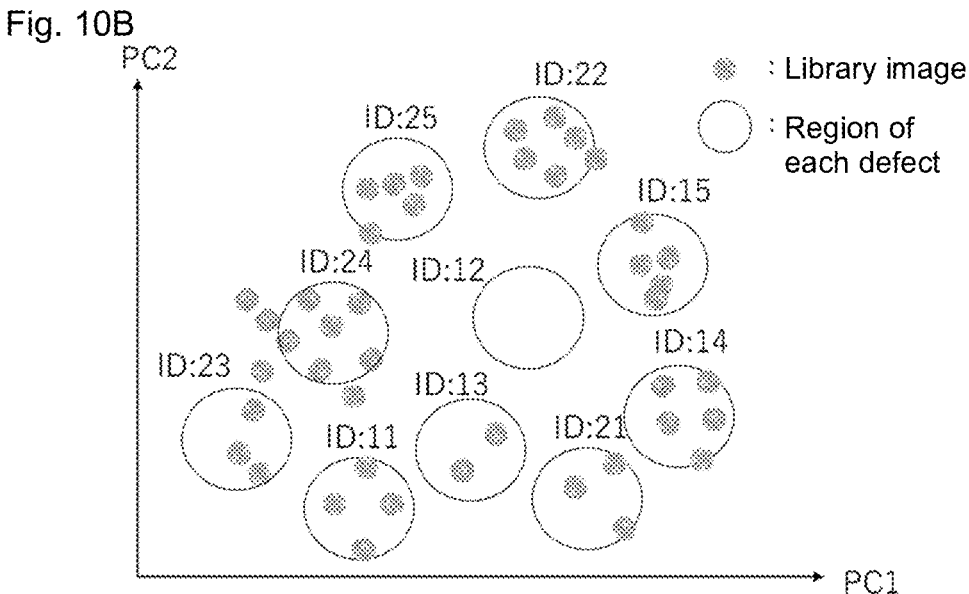

COMPONENT INSPECTION DEVICE

TECHNICAL FIELD

The present invention relates to a component inspection device.

BACKGROUND ART

A component inspection device is used to inspect whether a mounting component soldered to a printed circuit board is in a good mounting state or not. In such a component inspection device, in order to suppress erroneous detection (excessive check and overlooking), it is common to perform threshold adjustment (tuning) of an inspection logic (Patent Document 1 and the like).

The tuning work is performed by first registering, as model images, a non-defective product image and a defective product image that are actually generated in an inspection process, then virtually applying the inspection logic to the model images (referred to as a model test), and manually adjusting the threshold so that the non-defective product image and the defective product image can be correctly detected. The defective product image is indispensable in the tuning work, and the inspection logic is matured by repeating a fine threshold adjustment work many times while accumulating the defective product images; therefore, a lot of time and a skilled technique are required.

However, with recent technological innovations, performance of a manufacturing apparatus using a surface mounting technique is dramatically improved, and a defect occurrence rate is also reduced to a several ppm level. Therefore, it is not easy to collect actual defective product images. In particular, in a case where a new manufacturing line is installed, there is almost no defective product image; therefore, it is difficult to appropriately adjust the threshold, and the risk of erroneous detection is higher.

PRIOR ART DOCUMENTS

Patent Documents

Patent Document 1: Japanese Unexamined Patent Publication No. 2018-77147

SUMMARY OF THE INVENTION

Problems to be Solved by the Invention

An object of the present invention is to provide a technique for supporting a threshold adjustment work in a component inspection device to be effectively performed.

Means for Solving the Problem

According to the present invention, a defective product image is generated using a machine learning model, and a teaching process is performed using a generated defective product image, so that the threshold adjustment for component inspection can be effectively performed. More particularly, a component inspection device according to one aspect of the present invention includes: a storage section configured to store at least a non-defective product image; a generation section configured to generate a defective product image using a machine learning model; a setting section configured for a user to set a parameter for component inspection; and an output section configured to perform inspection, by using the parameter, on the non-defective product image stored in the storage section and the defective product image generated by the generation section, the output section being configured to output an inspection result.

As described above, by generating the defective product image using a machine learning technique, it is possible to increase the number of defective product images available for the teaching process, and the threshold can be appropriately adjusted.

In the present invention, the generation section may generate the defective product image by applying the machine learning model to at least any of the non-defective product images stored in the storage section. As the machine learning model, for example, a generative model based on a generative adversarial network (GAN) can be used.

By generating the defective product image on the basis of the non-defective product image in this manner, it is possible to generate a defective product image similar to the non-defective product image. That is, because it is possible to generate an image having a defect similar to a defect that can actually occur, the teaching process can be appropriately performed.

The present invention may further include a designation section configured for a user to designate a type of a defect of the defective product image to be generated by the generation section, and the generation section may generate the defective product image having a defect of the type designated by the designation section. The designation section may display a graphical user interface (GUI) such as a designation screen on which the user can designate a plurality of feature amounts representing the defects, and the GUI may be used to cause the user to designate the type of the defect to be generated. The designation screen may be configured such that the user can designate a region in a feature space including a plurality of feature amounts, and in at least any of the regions in the feature space, an image representing a defect corresponding to the feature space may be displayed. Alternatively, the designation screen may be configured such that the user can individually designate each of values of the plurality of feature amounts instead of designating a region in the feature amount space.

Such a configuration enables the user to generate a defective product image having a defect considered to be necessary for the teaching process. As a result, it is possible to perform the threshold adjustment that enables more appropriate inspection.

The present invention may further include a suggestion section that suggests a type of a defective product image to be generated. For example, in a case where the number of registered defective product images of a specific type is small, the suggestion section suggests to generate a defective product image of such type. As a specific method, the suggestion section can generate, by the generation section, a defective product image for each of a plurality of types of defects, perform a clustering process of classifying the generated defective product images into a plurality of clusters, determine to which cluster each of the defective product images stored in the storage section belongs, and suggest, as a type of defective product image to be generated, a defect corresponding to a cluster in which the number of existing defective product images is less than or equal to a predetermined number. Furthermore, when a defective product image corresponding to a certain cluster is generated, random noise may be added to generate an image having an unspecified defect in the cluster.

Such a configuration makes it possible to prompt the user to generate a defective product image insufficient in quantity and makes it possible to perform a more appropriate threshold adjustment.

In the present invention, the output section may output, as an inspection result, an inspection target image, information indicating whether the inspection target image is generated by the generation section or not, and information indicating which the inspection target image is determined to be, by using the parameter, a non-defective product or a defective product.

Since such an inspection result is displayed, the user can perform appropriate threshold adjustment or generate a defective product image insufficient in quantity.

Another aspect of the present invention is support method for supporting parameter setting for component inspection in a component inspection device, the support method including: a generation step of generating a defective product image using a machine learning model with respect to a stored non-defective product image; a setting step of receiving, from a user, setting of a parameter for component inspection; and an output step of performing an inspection on the stored non-defective product image and the generated defective product image by using the parameter and outputting an inspection result.

The present invention can also be considered as a program for implementing such a method or as a recording medium non-transitorily storing such a program. Note that each of the above methods and processes can be combined with each other as much as possible to constitute the present invention.

Effect of the Invention

According to the present invention, it is possible to support to effectively perform a threshold adjustment work in a component inspection device.

BRIEF DESCRIPTION OF THE DRAWINGS

FIGS. 10A and 10B are diagrams for describing a process, in the second embodiment, for suggesting a defect to be generated.

MODE FOR CARRYING OUT THE INVENTION

Application Example

Figure 1:
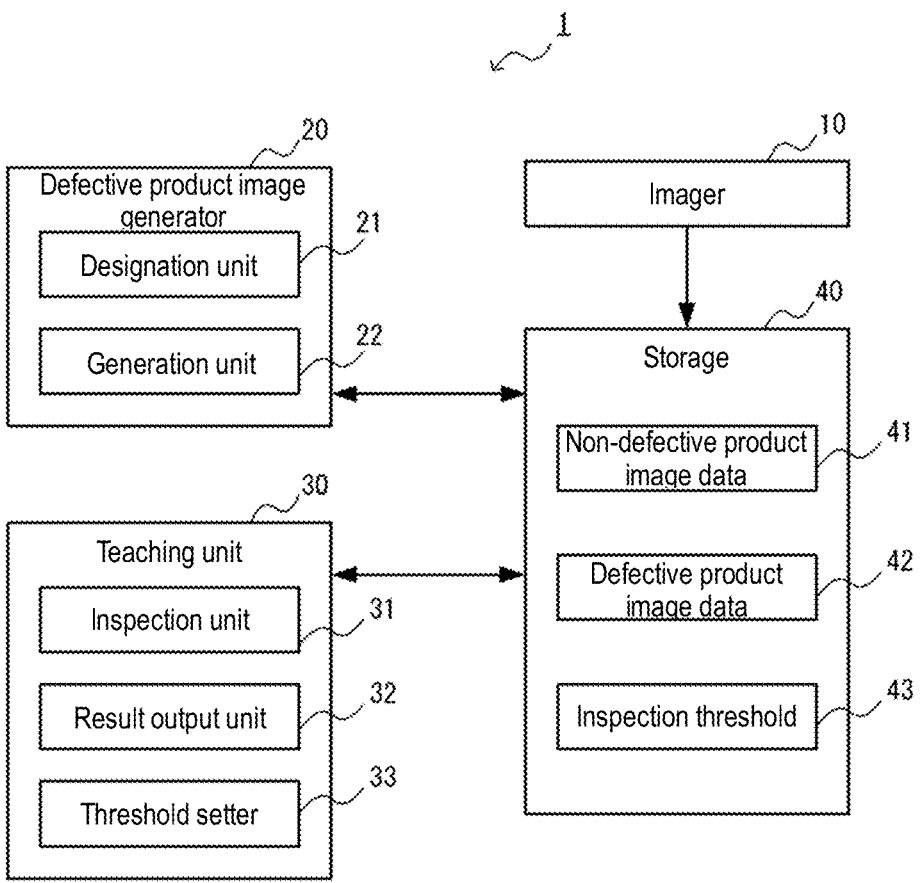
FIG. 1 is a diagram illustrating functional blocks of a component inspection device according to a first embodiment.

One application example of the present invention will be described with reference to FIG. 1. FIG. 1 illustrates a component inspection device 1 to which the present invention is applied, and the component inspection device 1 is characterized by a support technique for appropriately performing parameter adjustment (tuning work) for component inspection. A storage 40 stores non-defective product image data and defective product image data that are generated and imaged by an imager 10 in an actual manufacturing line. With the recent progress of manufacturing techniques, the defect occurrence rate has been reduced, and it is not easy to collect defective product images, which are necessary. Therefore, in the present invention, a defective product image generator 20 generates a defective product image on the basis of non-defective product image data 41 using a machine learning technique. A type of defect contained in an image to be generated is received from a user via a designation unit 21. As a result, it is possible to generate a defective product image that is similar to an actual non-defective product image and in which the type of defect designated by the user has occurred.

By performing threshold adjustment using the teaching unit 30 while using the thus generated defective product image, and the non-defective product image and the defective product image that are actually imaged, the user can perform appropriate tuning.

First Embodiment

Figure 2:
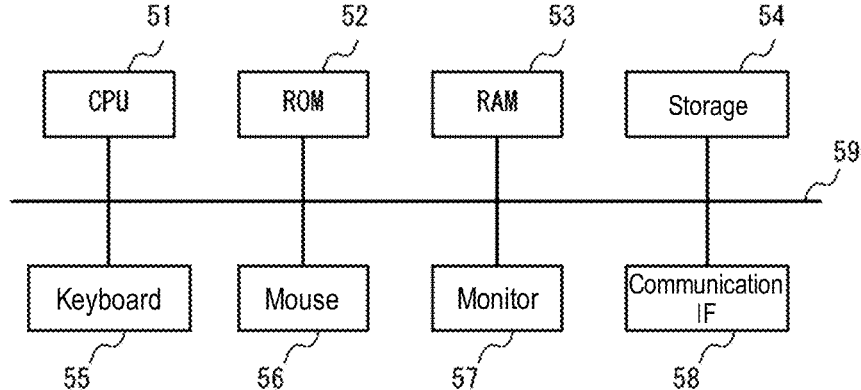
FIG. 2 is a diagram illustrating an example of a hardware configuration of the component inspection device.
Figure 3:
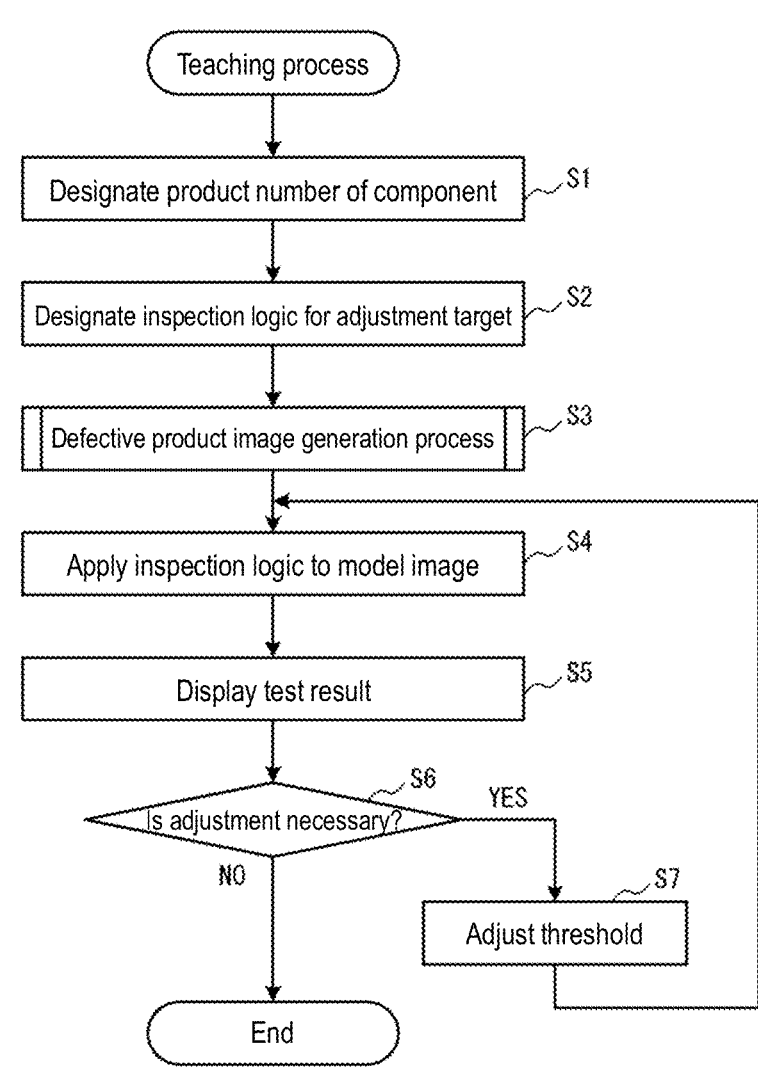
FIG. 3 is a diagram illustrating an overall flow of a teaching process (threshold adjustment process) performed by the component inspection device.
Figure 4:
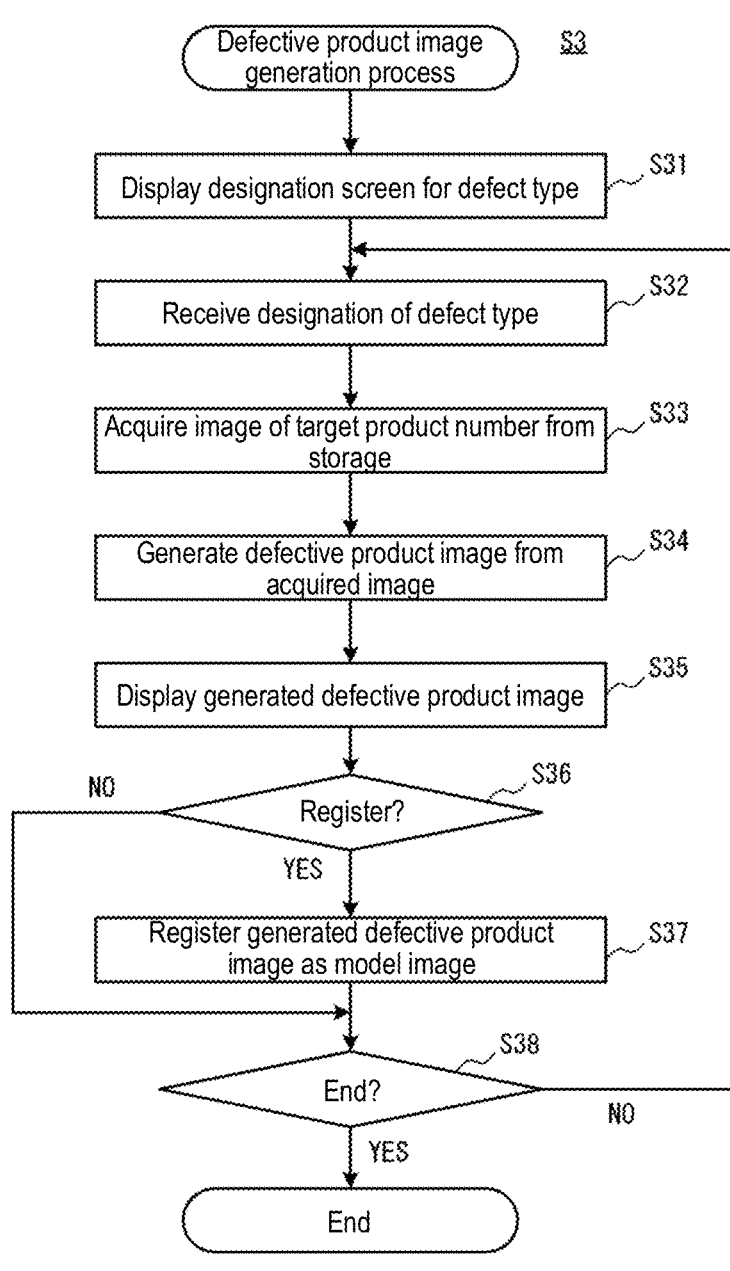
FIG. 4 is a diagram illustrating a flow of a generation process of a defective product image.
Figure 5:
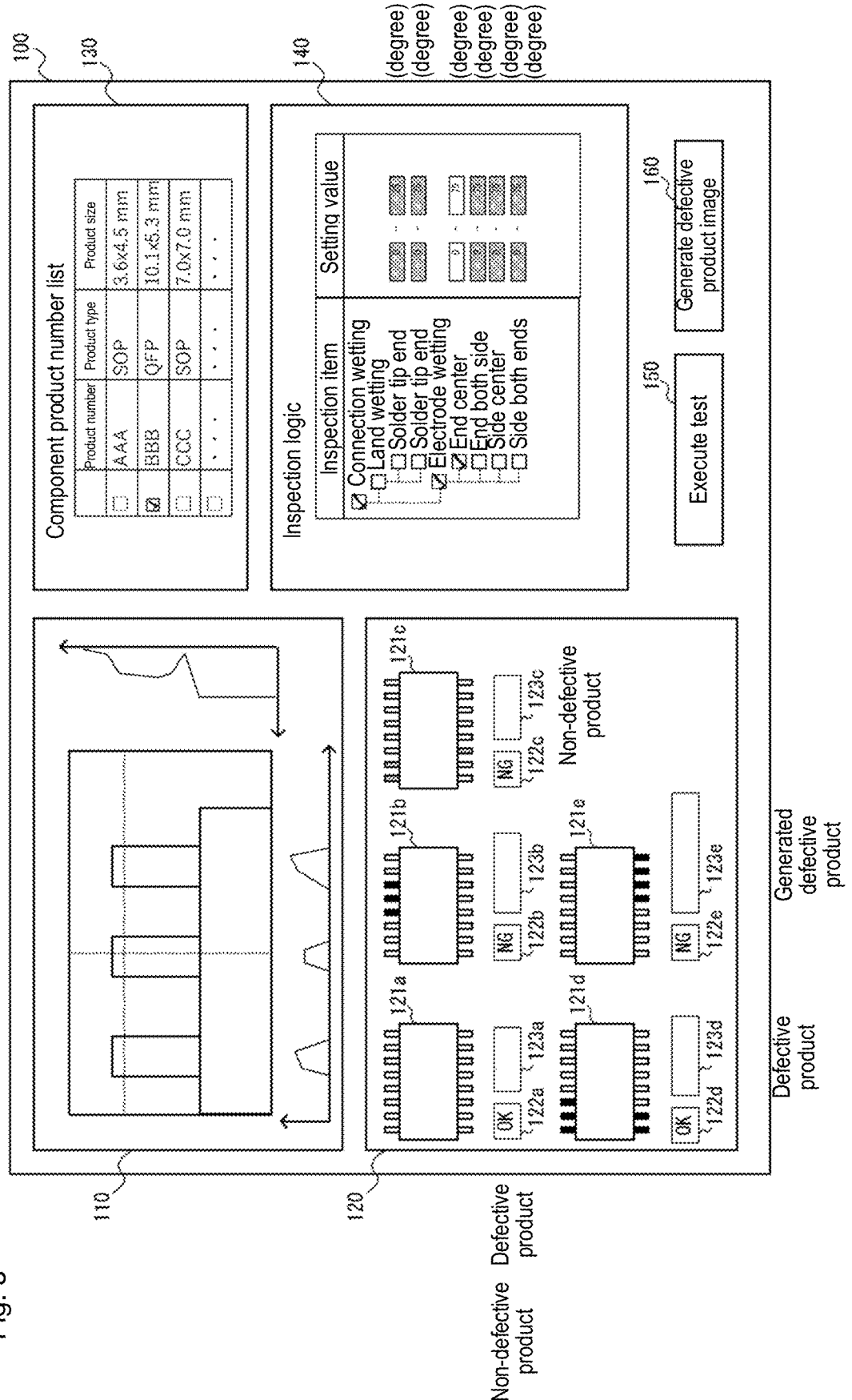
FIG. 5 is an example of a screen, used in the teaching process, for outputting a result of a model test and for threshold adjustment.
Figure 6:
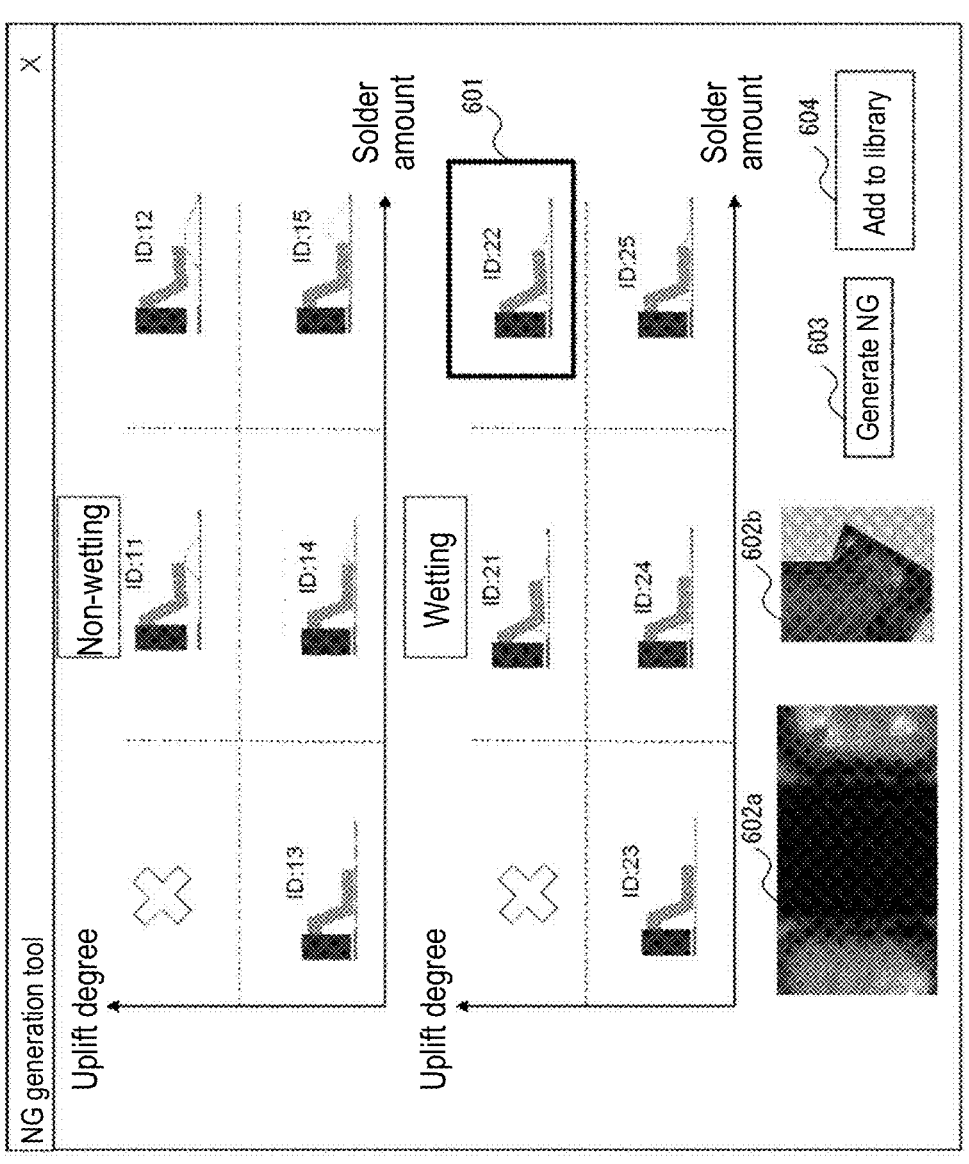
FIG. 6 is an example of a designation screen for designating a defective product image to be generated in a defective product image generation process.
Figure 7:
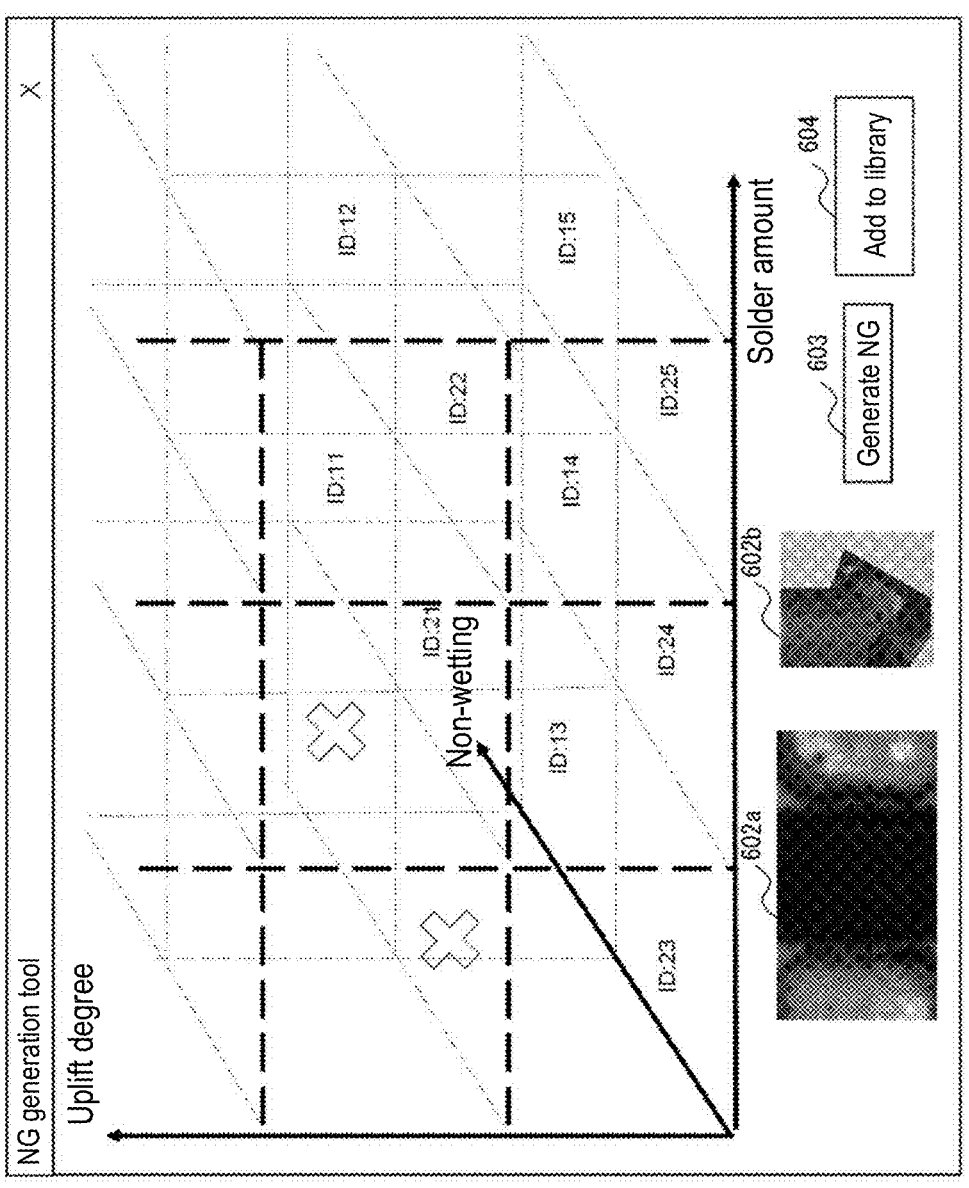
FIG. 7 is an example of a designation screen for designating a defective product image to be generated in the defective product image generation process.
Figure 8:
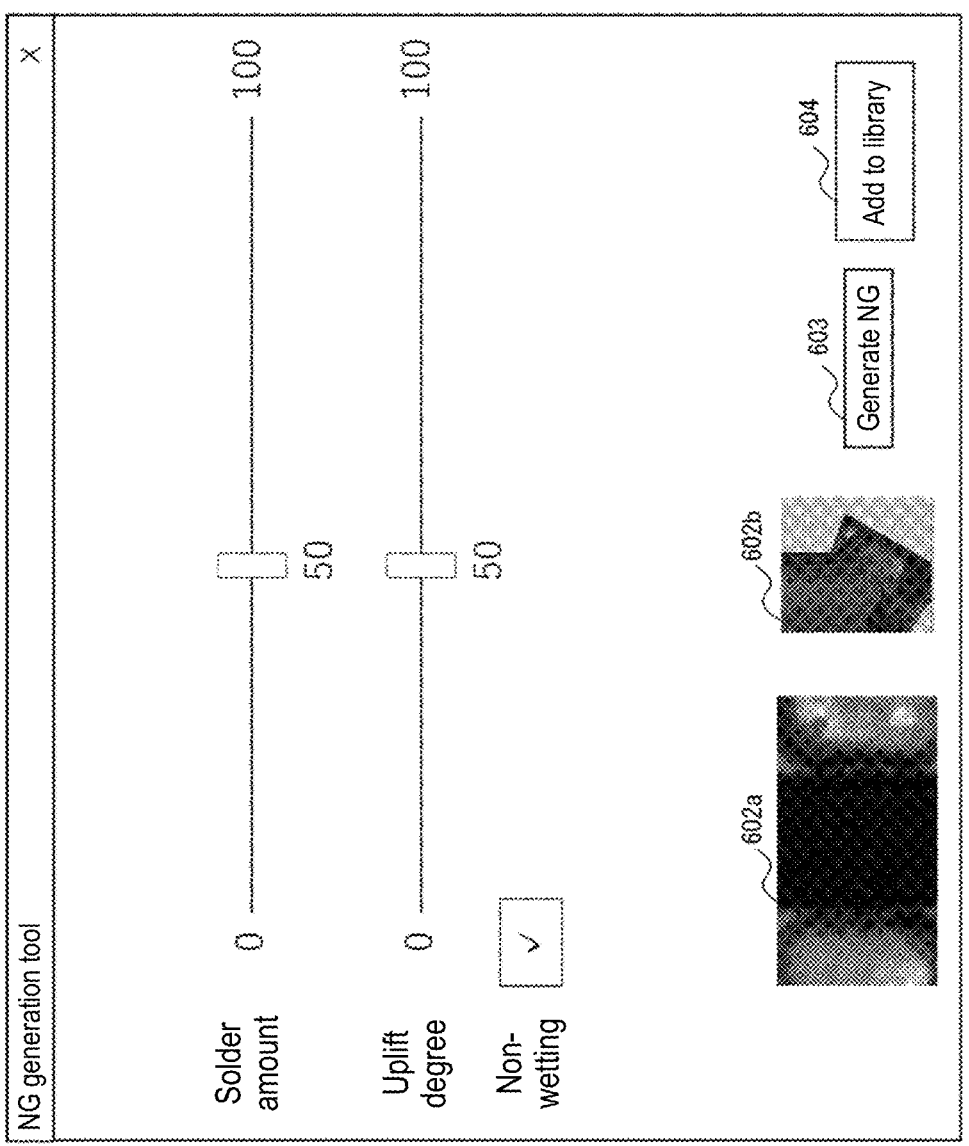
FIG. 8 is an example of a designation screen for designating a defective product image to be generated in the defective product image generation process.

With reference to FIGS. 1 to 5, a component inspection device 1 according to an embodiment of the present invention will be described in detail. FIG. 1 is a diagram illustrating functional blocks of the component inspection device 1. FIG. 2 is a diagram illustrating an example of a hardware configuration of the component inspection device 1. FIG. 3 is a diagram illustrating an overall flow of a teaching process (threshold adjustment process) performed by the component inspection device 1. FIG. 4 is a diagram illustrating a flow of a generation process of a defective product image. FIGS. 5 to 8 are examples of a display screen used in the teaching process, FIG. 5 is a screen mainly for a result of a model test and the threshold adjustment, and FIGS. 6 to 8 are designation screens each for designating a defective product image to be generated in a defective product image generation process.

The component inspection device 1 also has a function of actually performing a component inspection on the basis of a teaching result, and the function related to the teaching process of the component inspection device 1 will be mainly described below.

(Configuration)

As illustrated in FIG. 1, the component inspection device 1 includes an imager 10, a defective product image generator 20, a teaching unit 30, and a storage 40.

The imager 10 images an image of a component (for example, a component-mounted printed circuit board) in a manufacturing line. An image selected by a user from among the captured images is labeled as a non-defective product image or a defective product image, and is then stored in the storage 40 as a model image.

The defective product image generator 20 is a functional unit that generates a defective product image using a machine learning technique. The defective product image generator 20 includes: a designation unit 21 for receiving, from the user, designation of a defect type of the defective product image to be generated; and a generation unit 22 for generating a designated defective product image.

The designation unit 21 displays a screen (GUI) on which the user can designate the type of defect to be generated, and receives an input from the user.

The generation unit 22 applies a machine learning model to the non-defective product image stored in the storage 40 to generate a defective product image having the type of defect designated by the designation unit 21. The machine learning model used by the generation unit 22 is, for example, a generative model based on a generative adversarial network (GAN). In the GAN, the followings are learned: a generator that generates an image similar to a correct answer image; and a discriminator that discriminates whether an image is the correct image or the generated image. The generator is learned so as to be able to generate an image closer to the correct answer, and the discriminator is learned so as to be able to more accurately discriminate between the correct answer image and the generated image. The generation unit 22 generates and outputs, by using the generator, a defective product image in which a feature amount of the designated type of defect is transferred to an actual non-defective product image. As described above, it is possible to generate a defective product image having a defect of the type that is designated with respect to a component similar to a non-defective product image, that is to say, it is possible to generate a defective product image having high possibility of occurrence.

The teaching unit 30 is a functional unit used by a user to set a parameter (threshold) for component inspection. The teaching unit 30 includes an inspection unit 31, a result output unit 32, and a threshold setter 33. The inspection unit 31 performs inspection (test) on a model image stored in the storage 40 using a currently set logic and threshold value. Hereinafter, the test on the model image is also referred to as the model test. The result output unit 32 displays an inspection result by the inspection unit 31 to the user. Although details will be described later, the inspection result includes: an image of an inspection target component; information indicating whether the inspection target image is generated by the defective product image generator 20 or not; and information indicating which the inspection target image is determined to be, by using the current threshold, a non-defective product or a defective product.

The storage 40 stores non-defective product image data 41, defective product image data 42, and an inspection threshold 43. The non-defective product image data 41 is image data actually imaged by the imager 10. The defective product image data 42 includes: image data actually imaged by the imager 10; and image data generated by the defective product image generator 20, and information indicating whether the image data is actually imaged or generated is also stored in association with the image data. It is designated by the user which the image captured by the imager 10 is to be registered as, a mode image of a non-defective product image or a model image of a defective product image. The inspection threshold 43 is a threshold used for the component inspection logic and can be changed by the user via the teaching unit 30.

FIG. 2 is a diagram illustrating an example of a hardware configuration of the component inspection device 1. As illustrated in FIG. 2, the component inspection device 1 has a configuration similar to that of a general computer (information processing device), and includes a central processing unit (CPU) 51, a read only memory (ROM) 52, a random access memory (RAM) 53, a storage 54, a keyboard 55, a mouse 56, a monitor 57, and a communication interface 58. The components are mutually communicably connected via a bus 59.

In the embodiment, the ROM 52 or the storage 54 stores a learning program to perform a learning process of a learning model. The CPU 51 is a central processing unit, and executes various programs and control of each component. That is, the CPU 51 reads a program from the ROM 52 or the storage 54, and executes the program using the RAM 53 as a workspace. The CPU 51 performs control of each of the above components and various types of arithmetic processing according to a program recorded in the ROM 52 or the storage 54. The ROM 52 stores various programs and various types of data. The RAM 53 temporarily stores a program or data as a workspace. The storage 54 includes a hard disk drive (HDD), a solid state drive (SSD), or a flash memory, and stores various programs including an operating system and various types of data. The keyboard 55 and the mouse 56 are examples of an input device, and are used to perform various inputs. The monitor 57 is, for example, a liquid crystal display, and displays a user interface. The monitor 57 may adopt a touch panel system and function as an input unit. The communication interface 58 is an interface for communicating with another device, and for example, a standard such as Ethernet (registered trademark), FDDI, or Wi-Fi (registered trademark) is used.

(Process)

FIG. 3 is a flowchart illustrating an overall flow of the teaching process performed by the component inspection device 1. FIG. 4 is a flowchart illustrating a flow of the defective product image generation process. FIG. 5 is an example of a screen used in the teaching process.

First, the screen of FIG. 5 will be described. The screen 100 includes an enlarged image display area 110, a result output area 120, a product number designation area 130, a logic and threshold setting area 140, a test execution button 150, and a defective product image generation button 160. The product number designation area 130 is a GUI for designating a component (product number) as a target of threshold setting, and the target component is designated by the user checking a check box. The logic and threshold setting area 140 is a GUI for the user to select an inspection item and to input a threshold to be used for the inspection item. The result output area 120 displays: the image used for the test; the inspection result with respect to the current setting, and the information indicating which the image is in the followings: an actual non-defective product image; an actual defective product image; and a generated defective product image. In the enlarged image display area 110, an image selected from the plurality of images that are inspection targets is enlarged and displayed, and height profiles in the X-axis direction and Y-axis direction at the cursor position are displayed. By pressing the test execution button 150, the inspection based on the product number designation area 130 and the logic and threshold setting area 140 is executed. By pressing the defective product image generation button 160, a defective product image can be generated.

Next, teaching process will be described with reference to FIG. 3. When the teaching process is started, the teaching unit 30 displays the screen 100. Note that the process order in the flowchart illustrated in FIG. 3 is merely an example, and it is not necessary to perform the process in accordance with this order, and the process order may be appropriately changed.

In step S1, the teaching unit 30 receives designation of the component product number that is the target of the model test, via the product number designation area 130. In the example of FIG. 5, the product number "BBB" is selected in the product number designation area 130.

In step S2, the teaching unit 30 receives the designation of the inspection item of the model test, via the logic and threshold setting area 140. In the example of FIG. 5, electrode wetting at the end center is selected as an inspection item. When the inspection item is selected, the current threshold with respect to the selected inspection item is displayed in the logic and threshold setting area 140, and the values become editable.

When the product number and the inspection logic are designated, the teaching unit 30 may display the model image of the designated product number and display whether each model image is a non-defective product or a defective product with respect to the designated inspection item.

In step S3, when the user determines that the number of defective product images is insufficient to perform the model test, the user presses the defective product image generation button 160 to generate a defective product image and register a generated defective product image as a model image.

With reference to FIG. 4, the defective product image generation process in step S3 will be described in detail. This process is a process performed by the defective product image generator 20.

In step S31, a screen is displayed to for designating the type of defect to be generated by the designation unit 21. FIGS. 6 to 8 are examples of a screen for designating a defect type to be generated. Here, description will be given on three defects as the targets, that is, solder amount, uplift of electrode, and non-wetting of electrode. Because these defects are typical examples of defects for which appropriate threshold setting is difficult in teaching, it is preferable to generate defective product images for such defects, but defective product images may be generated for other defects.

FIGS. 6 and 7 are screens on which it is possible to designate a defect type to be generated, by designating a region in a feature amount space including three feature amounts indicating defects. In these examples, the user can designate the defect type to be generated, from the regions defined by dividing the solder amount into three levels, the degree of uplift of the electrode into two levels, and the wetting and non-wetting of the electrode into two levels. The solder amount and the uplift degree of electrode may be divided into more levels or into fewer levels. Wetting and non-wetting of the electrode is basically binary information, but may be divided into three or more levels. Note that because some feature amounts cannot be combined, such feature amounts cannot be selected on the screen.

In the example of FIG. 6, the defect types are shown in the following manner. The defect types are separated into wetting of electrode and non-wetting of electrode. The lateral axis and the vertical axis respectively represent, as regions in the space, the amount of solder and the uplift degree of electrode. On the screen, it is possible to select a total of 10 regions of ID11 to ID15 and ID21 to ID25. In addition, for each region, an image representing an example of the defect corresponding to this feature space. As a result, the user can easily understand what kind of defect is to be generated. The user selects, on this designation screen, which type of defect is to be generated. Here, a frame 601 indicates the defect selected by the user.

The example of FIG. 7 is a screen on which the type of defect is designated by designating the region in the feature amount space in the same manner as in FIG. 6, and the user designates a region in a three-dimensional space having three axes of solder amount, uplift degree, and wetting or non-wetting. Unlike FIG. 6, an image representing an example of a defect corresponding to each region is not displayed in FIG. 7, but may be displayed.

FIG. 8 is a diagram illustrating another example of the designation screen. On this designation screen, the user can individually input, directly as a value, the amount of solder, the uplift degree of electrode, and the wetting or non-wetting of electrode. In the example of FIG. 8, the GUI is used in which a scroll bar is used to input the solder amount and the uplift degree, but other GUIs may be used such as spin-up and spin down control or numerical value input in a text box. Furthermore, the wetting or non-wetting of electrode is binary information, and it is therefore convenient to designate by a check box.

In step S32, the designation unit 21 receives from the user the type of defect to be generated. Specifically, the designation unit 21 acquires, as the defect type to be generated, the defect type that is input when an NG generation button 603 is pressed in FIGS. 6 to 8.

In step S33, the generation unit 22 acquires the image of a target product number from the storage 40. The target product number is the product number designated in step S1. The generation unit 22 acquires one or a plurality of pieces of data of the target product number from the non-defective product image data 41 stored in the storage 40. In a case where there are many corresponding images in the storage 40, selection may be performed randomly or in accordance with a predetermined rule.

In step S34, the generation unit 22 generates a defective product image from the image acquired in step S33. As described above, the generation unit 22 includes a generator of a generative adversarial network (GAN), and can generate a defective product image as if the defective product image actually occurs on site, by inputting the acquired non-defective product image to the generator and adding, as noise, a feature amount of defect designated by the user. The noise to be added is determined from the designated feature amount space, for example, at random. Therefore, even if the designated types of defects are the same, fluctuation occurs in the actually generated defective product image, and it is possible to generate defective product images having the same type of defects but being different in detail.

In step S35, the generation unit 22 presents the generated defective product image to the user. Specifically, on the screens of FIGS. 6 to 8, the defective product images are displayed in the three-dimensional viewer parts 602*a* and 602*b*. With the three-dimensional viewer parts 602*a* and 602*b*, the user can check the generated defect while arbitrarily designating a display position, an enlargement ratio, and a viewpoint direction of the generated image.

In step S36, the user determines whether to register the generated defective product image as a model image or not. The user checks the defective product image using the three-dimensional viewer parts 602*a* and 602*b*, and when it is determined that the defective product image is an appropriate defective product image for use in the teaching press, the user presses the "Add to Library" button 604. When the button 604 is pressed, the process proceeds to step S37.

In step S37, the generated defective product image is stored in the storage 40 as a model image. At this time, the defective product image is stored in the storage 40 in such a manner that the defective product image can be distinguished as the defective product image generated by the defective product image generator 20.

In step S38, the user determines whether to generate another defective product image or not. When the generation is continued, the process returns to step S32, and when the generation is ended, the process is ended.

In this way, in the defective product image generation process of step S3, a pseudo defective product image having the defect designated by the user is generated by the generator based on the machine learning and is registered as a model image. Note that a generated image does not need to be a defective product image, and a non-defective product image can be generated by a similar process; therefore, a non-defective product image having desired characteristics may be generated and registered as a model image.

With reference to FIG. 3 again, the description will be continued. In step S4, the user presses the test execution button 150 to execute an inspection on the model image using the current inspection content and the inspection threshold. Specifically, the inspection unit 31 executes the inspection by the inspection logic designated in step S2 for each of the model images stored in the storage 40.

In step S5, the result output unit 32 outputs an inspection result in step S4 to the result output area 120 of the screen 100. In the result output area 120, the model image subjected to the model test, the result of the model test, and information on the model image are displayed. The information related to the model image includes the following information: the information indicating whether the model image is a non-defective product image or a defective product image; and in a case where the model image is a defective product image, the information indicating which the model image is, an actually imaged defective product image or a defective product image generated by the defective product image generator 20.

In the example of FIG. 5, five model images 121*a* to 121*e* are displayed in the result output area 120, and there are displayed their corresponding inspection results 122*a* to 122*e* and pieces of information 123*a* to 123*e* about the model images. Here, the model images 121*a* and 121*c* are actual non-defective product images, the model images 121*b* and 121*d* are actual defective product images, and the model image 121*e* is a defective product image generated by the defective product image generator 20. In addition, it can be seen that there is a following situation. A determination about being a non-defective product or a defective product is appropriately made with respect to the model images 121*a* and 121*b*, but an erroneous detection (excessive check), in which a non-defective product is determined to be a defective product, occurs with respect to the model image 121*c*, and an erroneous detection (overlooking), in which a non-defective product is determined to be a defective product, occurs with respect to the model image 121*d*.

In step S6, the user determines whether the inspection is correctly executed or not, that is, whether it is necessary to adjust the threshold value or not. When the threshold adjustment is necessary, the user changes the value of the threshold in the logic and threshold setting area 140. The threshold setter 33 stores the threshold changed by the user in the storage 40. Thereafter, the process returns to step S4 to execute the model test again.

In the flowchart of FIG. 3, when the threshold adjustment is necessary, only the threshold value is changed, but the defective product image generation process of step S3 may be performed to add a defective product image.

The user repeats the above process to adjust the threshold such that the component inspection can be correctly executed. The above processes can be performed for various product numbers and inspection logics.

With the embodiment, by generating a pseudo defective product image using a machine learning model, the pseudo defective product image can be used for the threshold adjustment process (teaching work). It has been becoming difficult to collect defective product images, in particular, the situation is remarkable in a case where a manufacturing line is newly installed. However, the shortage of non-defective product images can be covered by automatic generation, thereby enabling appropriate threshold adjustment. In addition, an image having a specific defect is sometimes required to check whether the threshold adjustment is appropriately performed. Such a defective product image can be designated and generated by the user; therefore, appropriate threshold adjustment is easy also from such a point of view.

In addition, since the defective product image is generated using a generative model of a generative adversarial network, the generated defective product image is an image close to the actual non-defective product image, and it is possible to generate a defective product image similar to a defect occurring at an actual site.

Second Embodiment

In the first embodiment, it is necessary for the user to designate by him or herself what defective product image is to be generated. The component inspection device according to the embodiment further has a function of suggesting what type of defective product image should be generated.

Figure 9A:
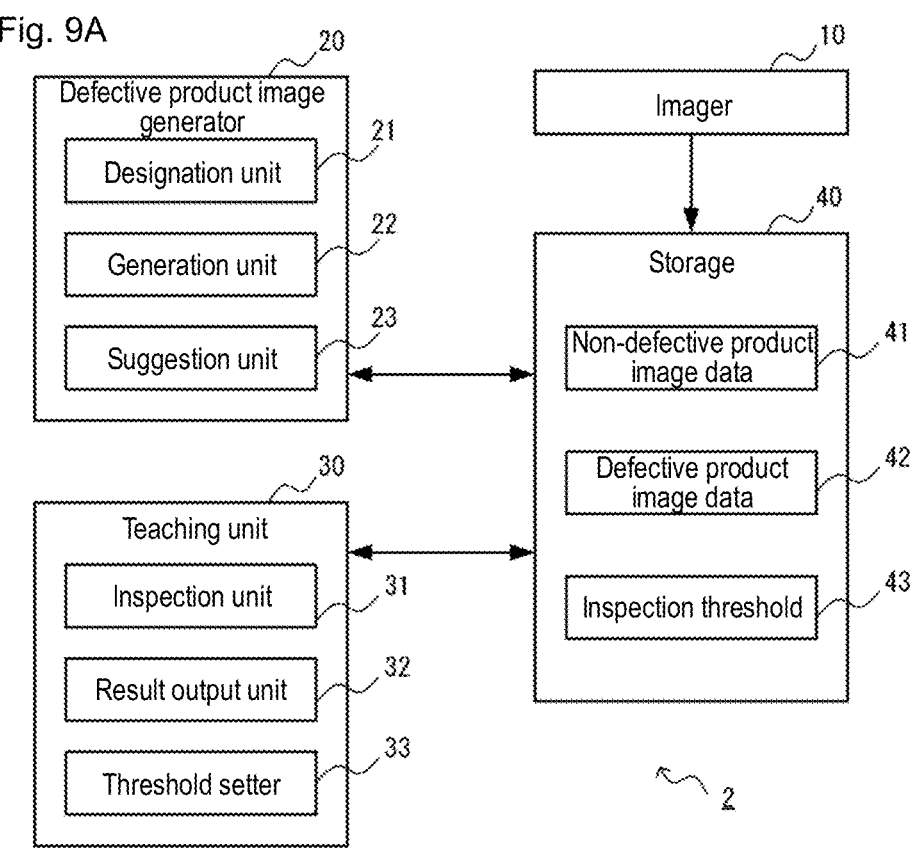
FIG. 9A is a diagram illustrating functional blocks of a component inspection device according to a second embodiment.

FIG. 9A is a diagram illustrating functional blocks of a component inspection device 2 according to the embodiment. The second embodiment is different from the first embodiment (FIG. 1) in that the defective product image generator 20 further includes a suggestion unit 23, and the other points are the same. Therefore, the suggestion unit 23 will be mainly described below.

Figure 9B:
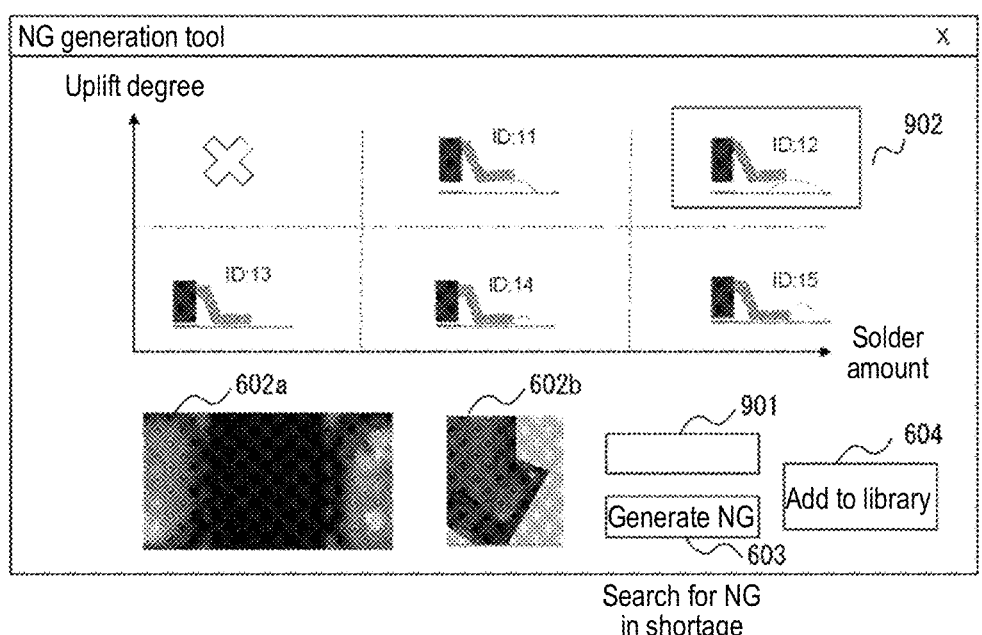
FIG. 9B is an example of a designation screen for designating a defective product image to be generated.

FIG. 9B illustrates an example of a designation screen on which the user designates the type of the defective product image to be generated. In the embodiment, the designation screen includes a button 901 for performing a function of suggesting a type of defect to be generated. When the button 901 is pressed, the suggestion unit 23 performs the generation image suggestion process illustrated in FIG. 10A.

In step S101, the suggestion unit 23 generates a defective product image using the generation unit 22 for each of a plurality of defect IDs. Here, it is assumed that a plurality of defective product images, for example, about 10 defective product images are generated for each defect.

In step S102, the suggestion unit 23 performs a principal component analysis or the like on the generated defective product images to extract feature amounts and maps the feature amounts in the feature amount space. In step S103, the suggestion unit 23 performs a clustering process on the defective product images on the feature amount space, thereby classifying the defective product images into a plurality of clusters. A method for clustering is not particularly limited, and for example, the k-means or the like may be used.

In step S104, the suggestion unit 23 extracts feature amounts of the model images (library images) stored in the storage 40 and maps the feature amounts on the feature amount space in a similar manner to step S102, thereby determining which cluster the model image is belongs to. In step S105, the suggestion unit 23 identifies a cluster in which no library image exists in the region. In step S106, with respect to the defect type corresponding to the cluster that has no model image in the region, the suggestion unit 23 suggests, by displaying an alert on the GUI, the user to generate a defective product image of this defect type. Note that, instead of suggesting a defect type corresponding to a cluster that has no model image at all, the suggestion unit 23 may suggest a defect type to which a predetermined number or less of model images belong.

FIG. 10B is a diagram for describing the above process. The regions in FIG. 10B represent clusters (each defective region) obtained by mapping the defective product images generated in step S101 in a two-dimensional space and by performing a clustering process. There are obtained 10 clusters (regions) in correspondence to 10 defect types. The dots in FIG. 10B are dots with which the model images are mapped on the two-dimensional space. This result shows that there is no model image included in the cluster of ID12.

Therefore, the suggestion unit 23 displays an alert 902 in the defect type designation screen (FIG. 9B) with respect to ID12, thereby showing that the ID12 is short of defects and an image of this type of defect should be generated. Note that when defect images are insufficient in quantity with respect to a plurality of types of defects, an alert may be displayed for each defect.

With the embodiment, it is automatically determined which type of defective product image is insufficient in quantity and it is suggested to generate the defective product image, so that time and effort of the user is reduced, and even an inexperienced user can appropriately perform threshold adjustment.

<Others>

The above embodiments merely describe, as examples, the configuration examples of the present invention. The present invention is not limited to the specific aspects described above, and various variations can be made within the scope of the technical idea.

For example, although a defective product image is generated in the above description, a non-defective product image may be similarly generated. Although a large number of non-defective product images can be obtained, a non-defective product image necessary for threshold adjustment cannot be obtained in some cases. Therefore, when a non-defective product image having desired characteristics is generated by a method similar to that described above, threshold adjustment can be more appropriately performed.

In the above examples, the inspection target is a component-mounted printed circuit board, but the inspection target component may be any component. In addition, the description has been given taking as examples type of defect, amount of solder, uplift of electrode, and non-wetting of electrode, but other types of defects may be inspection items.

In the above example, a defective product image is generated by a machine learning model based on a generative adversarial network (GAN). However, the defective product image may be generated by using any machine learning model other than the GAN, particularly, by using a deep generative model. The deep generative model includes, for example, a generative adversarial network (GAN), a variational autoencoder (VAE), and a flow-based generative model.

<Supplementary Note>

1. A component inspection device (1) including:
a storage section (40) configured to store at least a non-defective product image (41);
a generation section (22) configured to generate a defective product image using a machine learning model;
a setting section (21, 140) configured for a user to set a parameter for component inspection; and
an output section (32, 120) configured to perform inspection, by using the parameter, on the non-defective product image stored in the storage section and the defective product image generated by the generation section, the output section being configured to output an inspection result.

2. A support method for supporting parameter setting for component inspection in a component inspection device, the support method including:
a generation step (step S3) of generating a defective product image using a machine learning model with respect to a stored non-defective product image;
a setting step (step S7) of receiving, from a user, setting of a parameter for component inspection; and
an output step of performing an inspection on the stored non-defective product image (step S4) and the generated defective product image by using the parameter and outputting an inspection result (step S5).

DESCRIPTION OF SYMBOLS 1, 2 component inspection device
10 imager
20 defective product image generator
21 designation unit
22 generation unit
23 suggestion unit
30 teaching unit
31 inspection unit
32 result output unit
33 initial value setter
40 storage
41 non-defective product image data
42 defective product image data
43 inspection threshold

The invention claimed is:
1. A component inspection device comprising:
a storage section configured to store at least a non-defective product image;
a generation section configured to generate a defective product image using a machine learning model;
a setting section configured for a user to set a parameter for component inspection; and
an output section configured to perform inspection, by using the parameter, on the non-defective product image stored in the storage section and the defective product image generated by the generation section, the output section being configured to output an inspection result, wherein the output section outputs, as the inspection result, an inspection target image, information indicating whether the inspection target image is generated by the generation section or not, and information indicating which the inspection target image is determined to be, by using the parameter, from among a non-defective product or a defective product.
2. The component inspection device according to claim 1, wherein the generation section generates a defective product image by applying the machine learning model to at least any of the non-defective product images stored in the storage section.

3. The component inspection device according to claim 1, wherein the machine learning model is a deep generative model.

4. The component inspection device according to claim 1, further comprising:

a designation section configured for a user to designate a type of a defect of the defective product image to be generated by the generation section, wherein the generation section generates the defective product image comprising a defect of the type designated by the designation section.

5. The component inspection device according to claim 4, wherein the designation section displays a designation screen configured for a user to designate a plurality of feature amounts representing defects.

6. The component inspection device according to claim 5, wherein the designation screen is configured for a user to designate a region in a feature space comprising a plurality of feature amounts.

7. The component inspection device according to claim 6, wherein an image representing a defect corresponding to the feature space is displayed in at least any of the regions in the feature space.

8. The component inspection device according to claim 5, wherein the designation screen is configured for a user to individually designate each of values of the plurality of feature amounts.

9. The component inspection device according to claim 1, further comprising a suggestion section configured to suggest a type of a defective product image to be generated.

10. The component inspection device according to claim 9, wherein the suggestion section generates, by the generation section, a defective product image for each of a plurality of types of defects, performs a clustering process of classifying the generated defective product images into a plurality of clusters, determines to which cluster each of the defective product images stored in the storage section belongs, and suggests, as a type of defective product image to be generated, a defect corresponding to a cluster in which a number of existing defective product images is less than or equal to a predetermined number.

11. A support method for supporting parameter setting for component inspection in a component inspection device, the support method comprising:

a generation step of generating a defective product image using a machine learning model with respect to a stored non-defective product image;

a setting step of receiving, from a user, setting of a parameter for component inspection; and an output step of performing an inspection on the stored non-defective product image and the generated defective product image by using the parameter and outputting an inspection result, wherein the inspection result includes an inspection target image, information indicating whether the inspection target image is generated by the generation section or not, and information indicating which the inspection target image is determined to be, by using the parameter, from among a non-defective product or a defective product.

12. A non-transitory computer readable medium storing a program configured to cause a computer to execute each step of the method according to claim 11.

* * * * *